US005585631A

United States Patent [19]

Deguchi et al.

[11] Patent Number: 5,585,631

[45] Date of Patent: Dec. 17, 1996

[54] THERMAL IMAGE DETECTING APPARATUS HAVING DETECTING ELEMENTS ARRANGED ON A STRAIGHT LINE

[75] Inventors: Takashi Deguchi, Kusatsu; Takahito Chinomi, Shiga-ken; Makoto Shimizu, Kyoto; Yasuhito Mukai, Otsu, all of Japan

[73] Assignee: Matsushita Electric Industrial Co., Ltd., Osaka, Japan

[21] Appl. No.: 530,442

[22] Filed: Sep. 19, 1995

Related U.S. Application Data

[63] Continuation of Ser. No. 120,370, Sep. 14, 1993, abandoned.

[30] Foreign Application Priority Data

Sep. 17, 1992 [JP] Japan .................................... 4-247470

[51] Int. Cl.$^6$ .................................................... H04N 5/33

[52] U.S. Cl. ..................... 250/332; 250/334; 250/DIG. 1

[58] Field of Search .................................... 250/332, 334, 250/353, 338.3, 349, DIG. 1, 342; 340/567

[56] References Cited

U.S. PATENT DOCUMENTS

| | | | |
|---|---|---|---|
| 3,781,558 | 12/1973 | Anderson | 250/332 |
| 3,889,117 | 6/1975 | Shaw, Jr. | 250/334 |
| 4,994,664 | 2/1991 | Veldkamp | 250/353 |
| 5,218,345 | 6/1993 | Muller et al. | 250/342 |
| 5,283,551 | 2/1994 | Guscott | 250/332 |
| 5,453,618 | 9/1995 | Sutton et al. . | |

FOREIGN PATENT DOCUMENTS

| | | | |
|---|---|---|---|
| 0501253A1 | 9/1992 | European Pat. Off. . | |
| 119422 | 5/1987 | Japan | 250/338.3 |
| 261187 | 10/1988 | Japan | 250/DIG. 1 |
| 9210819 | 6/1992 | WIPO . | |

*Primary Examiner*—Carolyn E. Fields
*Attorney, Agent, or Firm*—Watson Cole Stevens Davis, P.L.L.C.

[57] ABSTRACT

An array of pyroelectric type heat detecting elements of different which are integrally incorporated with an optical system and which are arranged one dimensionally in a plane orthogonal to the optical axis of the optical system, and the optical system and the array of pyroelectric type heat detecting elements are rotated integrally with each other; thereby it is possible to obtain a two dimensional thermal image with a relatively simple structure.

12 Claims, 5 Drawing Sheets

THERMAL IMAGE DETECTING APPARATUS HAVING DETECTING ELEMENTS ARRANGED ON A STRAIGHT LINE

This application is a continuation of application Ser. No. 08/120,370, filed Sep. 14, 1993 (abandoned).

BACKGROUND OF THE INVENTION

The present invention relates to an apparatus for detecting a radiation temperature or a human behavior, and in particular to an apparatus for detecting a temperature distribution or human behavior in a home living room, with the use of a thermal image.

Conventionally, a quantum type infrared sensor and a thermal type infrared sensor have been used in order to detect a temperature in a non-contact manner. The quantum type infrared sensor is highly sensitive so as to be highly responsive, but requires cooling (down to about −200 deg. C.), and accordingly, it is not suitable for the people's livelihood. Meanwhile, the thermal type infrared sensor is relatively less sensitive so as to be less responsive, but does not require cooling, and accordingly, it has been commercially available.

Among various thermal type infrared sensors, a pyroelectric type infrared sensor has been frequently used.

Such a pyroelectric type infrared sensor has a differential variation output characteristic, that is, it delivers an output only when the input temperature varies. This pyroelectric type infrared sensor normally incorporates a compound eye type lens and a shutter adapted to be periodically opened and closed, and accordingly, it detects a time variation input such that the radiation temperature of a human body periodically bursts. Accordingly, the pyroelectric type infrared sensor delivers its output in synchronization with the above-mentioned time variation input.

Further, it has been proposed that these pyroelectric infrared sensors are arrayed two-dimensionally in order to provide a means for obtaining a two-dimensional image.

However, the two-dimensional array of the pyroelectric infrared sensors causes a system arrangement to be complicated.

SUMMARY OF THE INVENTION

One object of the present invention is to provide an apparatus for detecting a highly precise thermal image with a relatively simple system arrangement.

To this end, according to the present invention, there is provided an apparatus for detecting a two-dimensional thermal image, comprising an array of pyroelectric type heat detecting elements which are arrayed one-dimensionally on a straight line, an optical system integrally incorporated with the array of pyroelectric type heat detecting elements, and a rotary shaft inclined at a predetermined angle with respect to the straight line, whereby the array of pyroelectric type heat detecting elements and the optical system are rotated about the rotary shaft while the array of pyroelectric type heat detecting elements detect a temperature so as to obtain a two-dimensional thermal image.

According to one specific form of the present invention, the sizes of the pyroelectric type heat detecting elements in the array are different at least from one other.

According to another specific form of the present invention, the widthwise sizes of the heat detecting elements in the array are different from each other so as to compensate the optical aberration of the optical system in order to maintain the widthwise viewing angles of the elements through the optical system to be constant.

With the above-mentioned arrangement of the present invention, in which the optical system and the pyroelectric type heat detecting elements laid on the straight line that are inclined at a predetermined angle with respect to a vertical axis, the substantially horizontal lengths of the elements are short, but the substantially vertical lengths of the elements are long.

Further, according to another specific form of the present invention, the spaces between the elements are uniform.

Further, according to another specific form of the present invention, the spaces between the elements are different.

Further, according to another specific form of the present invention, in which the optical system and the pyroelectric type heat detecting elements arrayed on the straight line are inclined at a predetermined angle with respect to a vertical axis, the substantially horizontal lengths of the elements are short but the substantially vertical lengths of the elements are long, and the elements have uniform spaces therebetween.

Further, according to another specific form of the present invention, the rotational speed with which the array of pyroelectric type heat detecting elements are rotated about the rotary shaft while measuring a temperature is set to be larger than the horizontal viewing angle over which each of the elements scans during every measurement.

Further, according to another specific form of the present invention, the above-mentioned rotational speed is set to be twice as high as the horizontal viewing angle over which each of the elements scans during every measurement.

Further, according to another specific form of the present invention, the above-mentioned rotational speed is set to be substantially equal to the horizontal viewing angle over which each of the elements scans during every measurement.

Further, according to another specific form of the present invention, the above-mentioned rotational speed is selectively set to be twice as high as and substantially equal to the horizontal viewing angle over which each of the elements scans.

With the above-mentioned arrangement according to the present invention in which the array of pyroelectric type heat detecting elements and the optical system are rotated integrally with each other, it is possible to provide an apparatus for detecting a two-dimensional thermal image, which is simple in its structure but has a high degree of accuracy and a high performance.

Other features and advantages of the invention will be apparent from the following description taken in connection with the accompanying drawings, wherein:

DESCRIPTION OF THE PREFERRED EMBODIMENTS

Explanation will be made of two-dimensional thermal image detecting apparatus in a preferred embodiment of the present invention with reference to FIGS. 1 to 8*b*.

Figure 1:
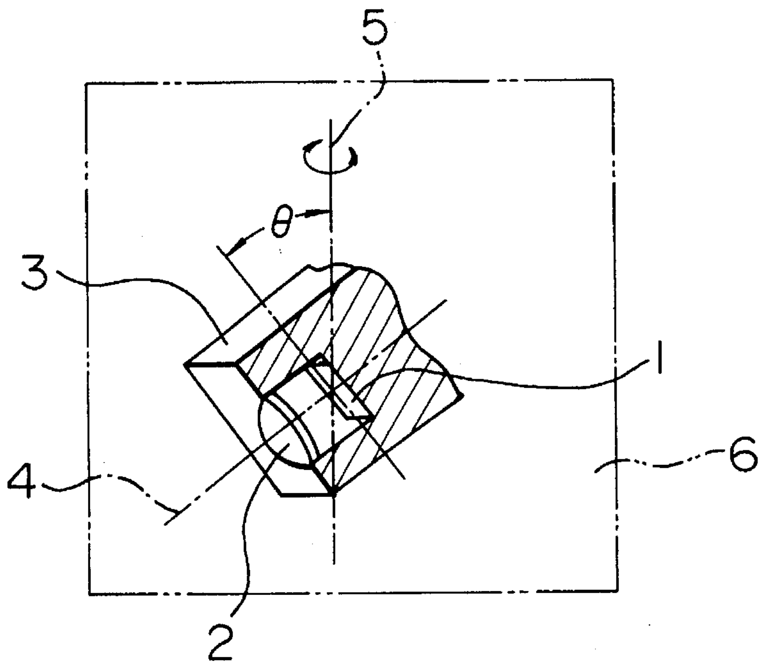
FIG. 1 is a schematic view illustrating an arrangement in which an array of pyroelectric type heat detecting elements and a lens are integrally incorporated with each other.
Figure 2:
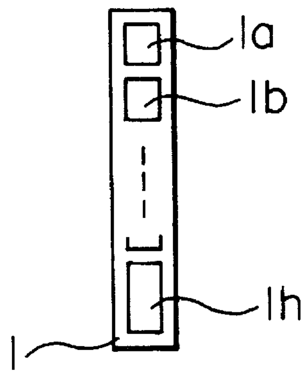
FIG. 2 is a view illustrating an array of pyroelectric type heat detecting elements having different sizes.

Referring to FIGS. 1 and 2, there are shown an array 1 of pyroelectric type heat detecting elements 1*a* to 1*h* (which will be simply denoted as "elements"), a structural body 3 in which the elements 1*a* to 1*h* and a lens 2 are integrally incorporated with each other. It is noted that the array 1 of the elements is laid in a plane substantially orthogonal to the optical axis 4 of the lens 2. The structural body 3 is rotated about a rotary shaft 5. The thermal image detecting apparatus comprising the components 1 to 5 is generally denoted by reference numeral 6.

FIG. 2 shows an example in which the array of the elements have different sizes. In this arrangement, the length of the element 1*h* is longer than that of the element 1*a* in the longitudinal direction in which the elements 1*a* to 1*h* are one-dimensionally arranged. The different sizes of the elements cause the spacial fields of views projected onto the elements to be different from one another, in combination with the lens 2. This fact will be hereinbelow explained.

Figure 3A:
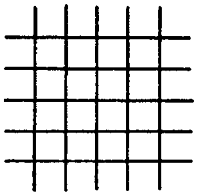
FIGS. 3*a* and 3*b* are explanatory views showing the optical aberration of an wide angle lens.
Figure 3B:
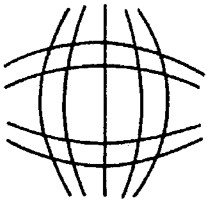

FIG. 3 is a view for explaining an optical aberration which is obtained when a lattice pattern is viewed through the lens 2. That is, when the lattice pattern (a) is viewed through the wide lens, a projected pattern (b) having its deformed periphery can be seen.

Figure 4:
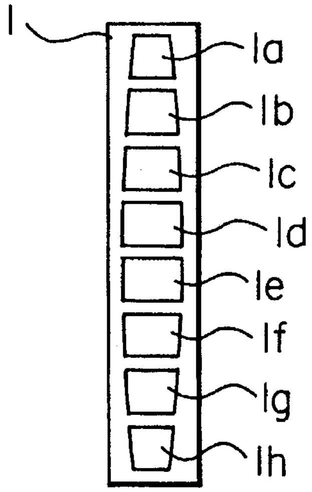
FIG. 4 is a view illustrating an array of pyroelectric type heat detecting elements having different widthwise sizes.

FIG. 4 shows an embodiment in which the widthwise sizes of the elements are changed in order to compensate the widthwise optical aberration. Accordingly, the elements in this configuration give an image having a uniform viewing angle in combination with the lens 2.

Figure 5:
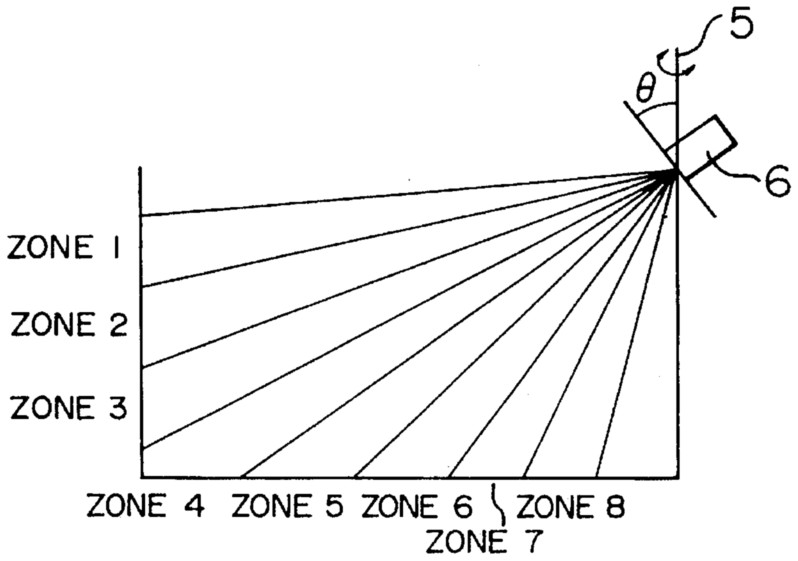
FIG. 5 is a view showing a vertical light distribution in the case of the inclination of the array of the pyroelectric type heat detecting elements.

FIG. 5 shows a vertical light distribution which is obtained by the array 1 of elements which are arranged on a straight line inclined by a predetermined angle θ from a vertical axis. In combination with the lens 2, the elements 1*a* to 1*h* scan zones 1 to 8 which are shown in a vertical plane, respectively. In the arrangement shown in FIG. 5 in which the thermal image detecting apparatus 6 monitors a living room, the nearer to the apparatus 6, the larger a human body to be monitored is observed.

Further, the further from the apparatus 6, the smaller the human body is observed. Accordingly, in such a case that uniform vertical viewing angles are allocated to the zones 1 to 8, the zones are large in comparison with the human body if the human body is far from the apparatus, that is, the number of zones from which the image of the human body can be obtained is less. On the contrary, if the human body is near to the apparatus, the number of zones from which the image of the human body is obtained, is large. In general the resolution of the image becomes worse if the human body is far from the apparatus, but becomes satisfactory if the human body is near to the apparatus. In order to resolve this problem, it is effective that the viewing angle of the zone 1 is set to be smaller than that of the zone 8. Accordingly, it is possible to balance the resolution of the image between the human body near to the apparatus and the human body far from the same. The array 1 of the elements is incorporated integrally with the lens 2. The vertical viewing angles of the zones can be changed from one another by changing the lengths of the elements. That is, the length of the element 1*a* corresponding to the zone 1 having a small viewing angle is set to be short, and the length of the element 1*h* corresponding to the zone 8 having a large viewing angle is set to be long.

Figure 6A:
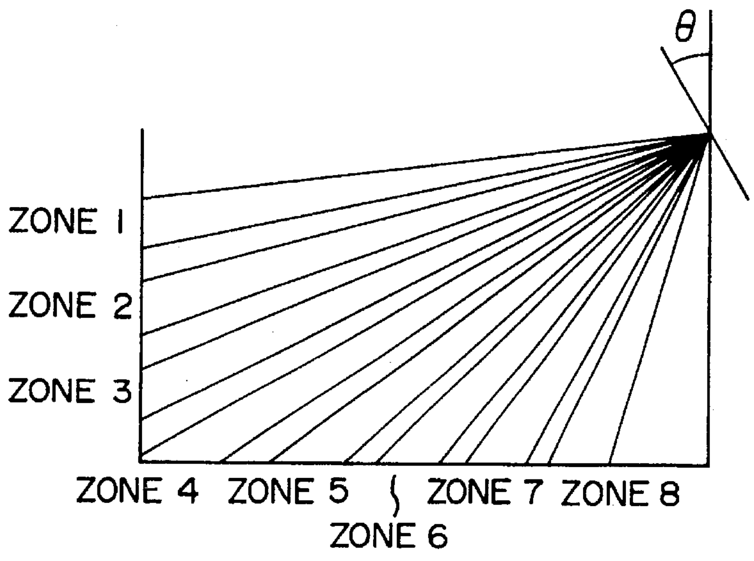
FIGS. 6*a* to 6*b* are views illustrating a vertical light distribution and the array of pyroelectric type heat detecting elements in such a case that the elements are arrayed at uniform intervals.
Figure 6B:
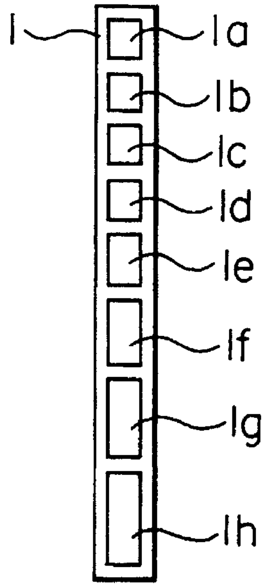

FIG. 6*a* shows a light distribution in such a case that the spaces between the adjacent elements are set to be uniform, and FIG. 6*b* shows the array 1 of the elements. If vertical viewing angles of the elements do not scan, that is, vertical blind zones are set to be as small as possible, the intervals of the elements are set to a uniform minimum value with which the array of the elements can be produced, and accordingly, it is possible to reduce the affection by the vertical blind zones. Further, as shown in FIG. 6*a*, the degrees of the vertical blind zones corresponding to the spaces between the adjacent elements are proportional to the distance from the thermal image detecting apparatus 6. Accordingly, if the spaces between the elements are set to be uniform, the nearer to the thermal image detecting apparatus 6, the smaller the vertical blind zones, or vice versa. Meanwhile, since the degrees of the zones become larger at a position far from the thermal image detecting apparatus 6, the ratio of a background image other than the human body image becomes larger per zone. If the human body is near to the apparatus, the image of the human body can be obtained from several zones and accordingly, either one of the zones is substantially occupied by the human body. Accordingly, if the human body is far from the apparatus, the human body image is faded by the background image so that the ability of the detection is lowered.

Thus it is necessary to precisely detect the human body by appropriately setting the vertical blind zones caused by the spaces between the elements. In FIG. 6*a*, the spaces between the elements are set to be uniform, but the zone 8 is set to be larger than the zone 1. That is, since the element 1*h* is longer than the element 1*a*, the rate of the vertical blind zone becomes larger along the zone 1. Thus, the image of the human body located at the center of the area 1 can be more precisely detected. However, if the human body is present within the vertical blind zone, the image of the human body can hardly be detected, but since the human body is usually moved, no particular problem occurs if the detection is made continuously. Further, the rate of the vertical blind zone along the area 8 is small, and accordingly, a large area can be measured, it can be expected to enhance the accuracy of the measurement. Further, the vertical blind zones can be decreased as far as possible by setting the spaces between the elements to a lower limit value with which the array of the element can be produced, while maintaining the above-mentioned function.

Figure 7A:
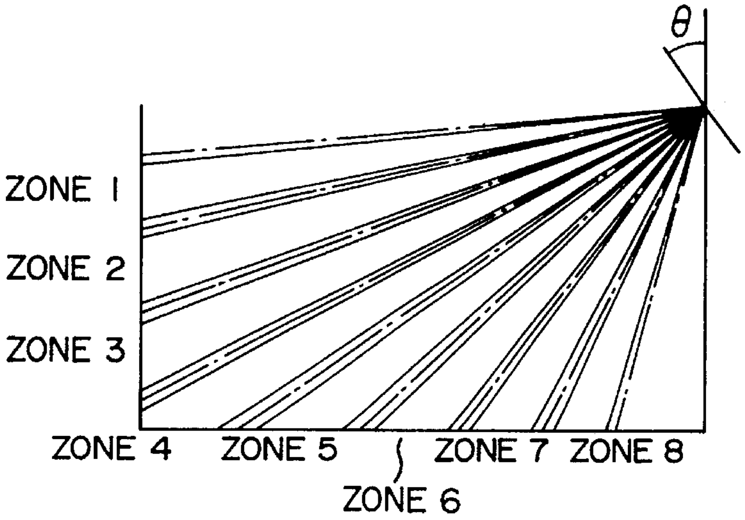
FIGS. 7*a* to 7*b* are views illustrating a vertical light distribution and the array of pyroelectric type heat detecting elements in such a case that the rates of blind zones are set to be constant.
Figure 7B:
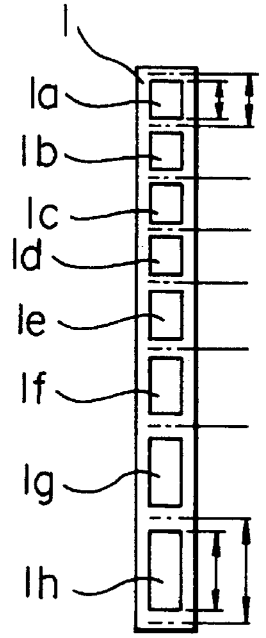

FIGS. 7*a* to 7*b* show an embodiment in which the rates of the vertical blind zones are set to be uniform along the zones. In particular, FIG. 7*a* shows a light distribution in this example, and FIG. 7*b* shows an array 1 of elements. The sizes of the zones 1 to 8 are changed, similar to that shown in FIG. 6. Since the rate of an image per zone is set to be uniform, the rate between the vertical blind zone and the vertical detecting zone per zone is st to be constant. Since the rate of the image occupying each zone is set to be constant, the image of a human body positioned at the center of the zone 1 can be precisely detected, but an exothermic body smaller than the human body, such as a pet, for example, a cat, can be precisely detected in the zone 8.

Next explanation will be made of the horizontal array of image data detected successively by the elements when the array 1 of the elements and the lens 2 are rotated integrally with each other in a horizontal direction about the rotary shaft 5 while the temperature is measured so as to obtain a two-dimensional image.

Figure 8A:
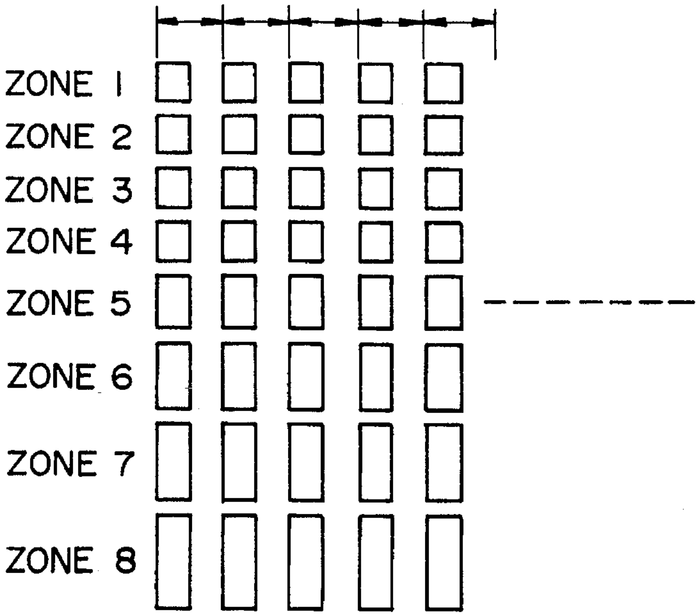
FIGS. 8*a* to 8*b* are views illustrating horizontal image data.
Figure 8B:
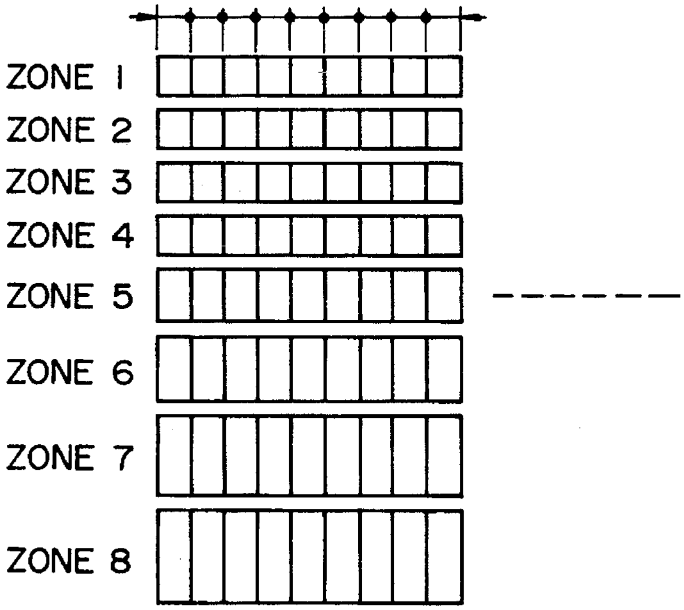

Specifically, FIG. 8*a* shows an array of image data in such a case that the rotational speed is set to be substantially twice as high as a horizontal viewing angle which is determined by the width of the elements, and FIG. 8*b* shows an array of image data in such a case that the rotational speed is set to be substantially equal to the horizontal viewing angle which is determined by the width of the elements. The data shown in FIG. 8*a* can be obtained over a range which is twice as large as a range over which the data shown in FIG. 8*b* is obtained, within an equal detection time period. Further, the horizontal blind zone becomes one-half so that a resolution suitable for the detection of a human body can be obtained.

Further, the horizontal viewing angle of the thermal image detecting apparatus can be optionally set without the number of total image data being altered, by suitably selecting a scale factor for the horizontal viewing angle which is determined by the width of the elements.

Further, it is possible to obtain precise image data from FIGS. 8*a* to 8*b*. With the use of the image data shown in FIGS. 8*a* and 8*b* in combination, an approximate place where the human body is present is at first detected from the image data shown in FIG. 8*a*, and then, data such as a temperature and a position of the detected human body can be then detected from the image date shown in FIG. 8*b*.

According the present invention, with the thermal image detecting apparatus which comprises the array of pyroelectric type heat detecting elements arranged one-dimensionally on the straight line, the optical system being integrally incorporated with the array of pyroelectric type heat detecting elements, and the rotary shaft being in parallel with or inclined to the straight line, whereby the array and the optical system are rotated about the rotary shaft while the array of the elements detects a temperature so as to obtain a two-dimensional image, at least the sizes of the elements are different from each other so as to change the viewing angles over which the elements scan.

Further, the sizes of the elements are different from each other in the longitudinal direction in which the elements are one-dimensionally arranged, so that the vertical viewing angles which the elements can scan are changed.

Further, the widthwise sizes of the elements are suitably changed so as to make the widthwise viewing angle of the elements constant.

Further, with the arrangement comprising the array of pyroelectric type heat detecting elements and the optical system which are inclined by a predetermined angle from the vertical axis, the substantially horizontal lengths of the elements are short but the substantially vertical lengths of the elements are long so as to balance the resolution of the image between such a case that the human body is near to the apparatus and such a case that the human body is far from the apparatus.

Further, the spaces between the elements are set to be uniform so that the blind zones can be set to be as small as possible, and accordingly, the affection thereby can be made to be less.

Further, the spaces between the elements are different from each other so that the vertical blind zones can be suitably set, and accordingly, a human body and a small exothermic body such as a pet can be precisely detected.

Further, the horizontal lengths of the elements are short but the, vertical length of the elements are long, and the spaces between the elements are set to be constant, and accordingly, the image of a human body located at the center of a zone which is nearly horizontal can be precisely detected while the accuracy of the measurement can be enhanced in a zone which is nearly vertical.

Further, the speed at which the array of the pyroelectric type heat detecting elements is rotated while a temperature is detected, is set to be higher than the horizontal viewing angle of the elements during every measurement, and accordingly, the horizontal viewing angle of the thermal image detecting apparatus can be optionally set without changing the number of total image data.

Further, the rotational speed is set to be substantially twice as high as the horizontal viewing angle over which the elements can scan, and accordingly, the horizontal blind zones becomes one half so as to obtain a resolution suitable for detection of a human body.

Further, the rotational speed is set to be substantially equal to the horizontal viewing angle so as to obtain more precise image data.

Further, the rotational speed can be set to be substantially as twice as high as and also to be substantially equal to the horizontal viewing angle over which the elements can scan, and accordingly, an approximate place where a human body is present can be detected in the case of the twice high rotational speed, and then the data such as the temperature and the position of the human body can be precisely detected in the case of the equal rotational speed.

What is claimed is:

1. A thermal image detecting apparatus for obtaining a two-dimensional thermal image, said apparatus comprising:

an array of heat detecting elements having different dimensions and arranged one-dimensionally on a straight line;

an optical system integrally incorporated with said array of heat detecting elements;

a rotary shaft on which said array of heat detecting elements and said optical system are mounted, said straight line being inclined at a predetermined angle to said rotary shaft; and means for rotating said rotary shaft at a predetermined speed so as to rotate said array and said optical system at said predetermined speed which permits said array of heat detecting elements to detect a temperature of a human body in motion, said predetermined speed being larger than a horizontal viewing angle over which said array scans during a measurement of said temperature divided by a time interval required for said measurement of said temperature.

2. An apparatus as set forth in claim 1, wherein said elements have different lengths parallel to said straight line, and said different dimensions comprise said different lengths.

3. An apparatus as set forth in claim 2, wherein said rotary shaft is disposed vertically, and wherein said array comprises first heat detecting elements with substantially horizontal viewing areas and first lengths and second heat detecting elements with substantially vertical viewing areas and second lengths greater than said first lengths.

4. An apparatus as set forth in claim 1, wherein said elements have different widths perpendicular to said straight line, and wherein said different dimensions comprise said different widths, so as to compensate an optical aberration of the optical system, whereby widthwise viewing angles of said elements through said optical system are set to be constant.

5. An apparatus as set forth in claim 1 wherein spaces between said elements are set to be substantially constant.

6. An apparatus as set forth in claim 1, wherein spaces between said elements are set to be different from one another.

7. An apparatus as set forth in claim 1, wherein said rotary shaft is disposed vertically, and wherein said rotational speed is set so that said array in combination with said optical system horizontally scans with horizontal blind zones, each of said horizontal blind zones having a horizontal width substantially equal to a horizontal width of said array.

8. An apparatus as set forth in claim 1, wherein said heat detecting elements in said array are pyroelectric type heat detecting elements.

9. An apparatus as set forth in claim 1, wherein said predetermined angle is an acute angle.

10. An apparatus as set forth in claim 1, wherein said heat detecting elements in said array are of different areas.

11. An apparatus as set forth in claim 1, wherein said rotary shaft is disposed vertically, and wherein said rotational speed is controllably set to either a first rotational speed so that said array in combination with said optical system horizontally scans with horizontal blind zones, each of said horizontal blind zones having a horizontal width substantially equal to a horizontal width of said array or a second rotational speed so that said array in combination with said optical system horizontally scans with no horizontal blind zones.

12. A thermal image detecting apparatus for obtaining a two-dimensional thermal image, said apparatus comprising:

an array of heat detecting elements having different dimensions and arranged one-dimensionally on a straight line;

an optical system integrally incorporated with said array of heat detecting elements:

a rotary shaft on which said array of heat detecting elements and said optical system are mounted, said straight line being inclined at a predetermined angle to said rotary shaft; and means for rotating said rotary shaft at a rotational speed so as to rotate said array and said optical system at said rotational speed which permits said array of heat detecting elements to detect a temperature of a human body in motion;

wherein said rotational speed is set so that said array in combination with said optical system horizontally scans with no horizontal blind zones.

* * * * *